United States Patent
Yamada

(10) Patent No.: US 7,013,241 B2
(45) Date of Patent: Mar. 14, 2006

(54) ELECTRONIC CONTROL UNIT

(75) Inventor: Fujiki Yamada, Ama-gun (JP)

(73) Assignee: DENSO Corporation, Kariya (JP)

( * ) Notice: Subject to any disclaimer, the term of this patent is extended or adjusted under 35 U.S.C. 154(b) by 16 days.

(21) Appl. No.: 10/761,377

(22) Filed: Jan. 22, 2004

(65) Prior Publication Data
US 2004/0153286 A1 Aug. 5, 2004

(30) Foreign Application Priority Data
Jan. 23, 2003 (JP) .............................. 2003-015324

(51) Int. Cl.
G06F 11/30 (2006.01)

(52) U.S. Cl. ................. 702/183; 701/33; 701/29; 701/43

(58) Field of Classification Search .................. 702/33, 702/35, 105, 182, 183, 185; 701/29, 33, 701/43; 340/438
See application file for complete search history.

(56) References Cited

U.S. PATENT DOCUMENTS

| | | | |
|---|---|---|---|
| 5,440,487 A | | 8/1995 | Althoff et al. |
| 5,537,590 A | * | 7/1996 | Amado ........................... 707/2 |
| 5,550,736 A | | 8/1996 | Hay et al. |
| 5,654,888 A | | 8/1997 | Muller et al. |
| 6,006,156 A | * | 12/1999 | Tozzi ........................ 701/114 |
| 6,076,504 A | * | 6/2000 | Stavnheim et al. ......... 123/447 |
| 6,085,144 A | * | 7/2000 | Tozzi ........................ 701/114 |
| 6,408,242 B1 | * | 6/2002 | Tozzi ........................ 701/114 |
| 6,526,948 B1 | * | 3/2003 | Stavnheim et al. ......... 123/497 |
| 6,701,232 B1 | * | 3/2004 | Yamaki ....................... 701/33 |
| 2002/0161495 A1 | * | 10/2002 | Yamaki ....................... 701/33 |
| 2003/0109972 A1 | * | 6/2003 | Tak ............................. 701/29 |

FOREIGN PATENT DOCUMENTS

| | | |
|---|---|---|
| EP | 0399308 A2 | 1/1990 |
| EP | 0575854 A2 | 12/1993 |
| JP | 11-294252 | 10/1999 |
| JP | 2000-172521 | 6/2000 |
| JP | 2001-202129 | 7/2001 |
| JP | 2002-371897 | 12/2002 |

* cited by examiner

Primary Examiner—Carol S. W. Tsai
(74) Attorney, Agent, or Firm—Nixon & Vanderhye P.C.

(57) ABSTRACT

In an electronic control unit having two computers, the first computer, which is an engine control microcomputer, performs multiple diagnoses and sends data regarding the diagnoses to the second computer, which is a throttle control microcomputer. The data includes a transmission ID, a calculated value and a reference value. The throttle control microcomputer directly monitors completion of the diagnoses based on the data.

16 Claims, 8 Drawing Sheets

ELECTRONIC CONTROL UNIT

CROSS REFERENCE TO RELATED APPLICATION

This application is based on and incorporates herein by reference Japanese Patent Application No. 2003-15324 filed on Jan. 23, 2003.

FIELD

Exemplary embodiments of the present invention relate to an electronic control unit having two computers, one of which monitors operation of the other computer.

BACKGROUND

An electronic control unit proposed in Japanese Patent Document No. JP-A-11-294252 includes an engine control microcomputer (engine MC) and a throttle control microcomputer (throttle MC). The engine MC contains a monitoring program for monitoring operation of the throttle MC. The monitoring program is independent from a base program that is programmed for various engine controls, and periodically executed by an interrupt.

The monitoring program compares a value calculated from data stored in the engine MC (e.g. fuel injection quantity) with a value calculated from data transmitted from the throttle MC. The values are calculated using the same operation. If the values match, the engine MC determines that the throttle MC operates normally.

Two watchdog timers are provided for the engine MC. One of the watchdog timers is used for monitoring the engine MC for proper execution of the base program. The other watchdog timer is used for monitoring the engine MC for proper execution of the monitoring program.

When the monitoring program is executed, it is determined whether subroutines contained in the monitoring program are executed in a predetermined sequence. If not, an output of watchdog pulses to the watchdog timer is stopped. In this case, the engine MC may not be able to monitor the throttle MC. Therefore, the watchdog timer for monitoring proper execution of the monitoring program stops power supply to a motor that drives a throttle valve.

In this device, the execution of the monitoring program is determined proper as long as the watchdog pulses are outputted to the watchdog timer. The engine MC cannot directly monitor the execution of the monitoring program, namely, the engine MC cannot directly monitor execution of required diagnosis. Thus, a fault cannot be detected if it occurs during the execution of the monitoring program under a condition that the watchdog pulses are outputted although the diagnosis is not performed.

An electronic control unit for controlling vehicular engine throttle valve performs various diagnoses, including verifications of parameter, data, and programs stored in a ROM. Therefore, monitoring executions of the diagnoses are very important for proper performance of the control.

SUMMARY

One feature of exemplary embodiments of the present invention is to provide an electronic control device having two computers, one of which directly monitors the other computer for proper executions of diagnoses. An electronic control device of exemplary embodiments of the present invention has a first computer and a second computer. The first computer includes a first fault diagnostic means and a data transmitting means.

The fault diagnostic means performs first and second diagnoses. Values are calculated using at least two kinds of calculations. In the first diagnosis, a comparison is performed between the first value and a pre-stored first reference value, and it is determined whether a relationship between them is normal. In the second diagnosis, a comparison is performed between the second value and a pre-stored second reference value, and it is determined whether a relationship between them is normal. The data transmitting means sends data regarding the first and the second diagnoses to the second computer.

The second computer includes a data receiving means and a second fault diagnostic means. The data receiving means receives the data regarding the first and the second diagnoses. The second fault diagnostic means performs a diagnosis of the first fault diagnostic means. In the diagnosis, it is determined whether the first fault diagnostic means functions normally based on the data received by the receiver means.

The first computer proposed in Japanese Patent Document No. JP-A-11-294252 only sends watchdog pulses to the second computer. However, the first computer of exemplary embodiments of the present invention sends the data regarding the diagnoses to the second computer, and the second computer diagnoses executions of the diagnoses based on the received data. Therefore, the second computer can directly monitor executions of multiple diagnoses performed by the first computer.

BRIEF DESCRIPTION OF THE DRAWINGS

The above and other objectives, features and advantages of exemplary embodiments of the present invention will become more apparent from the following detailed description made with reference to the accompanying drawings. In the drawings.

DETAILED DESCRIPTION OF NON-LIMITING EXEMPLARY EMBODIMENTS

The exemplary embodiments of the present invention will be explained with reference to the accompanying drawings.

Figure 1:
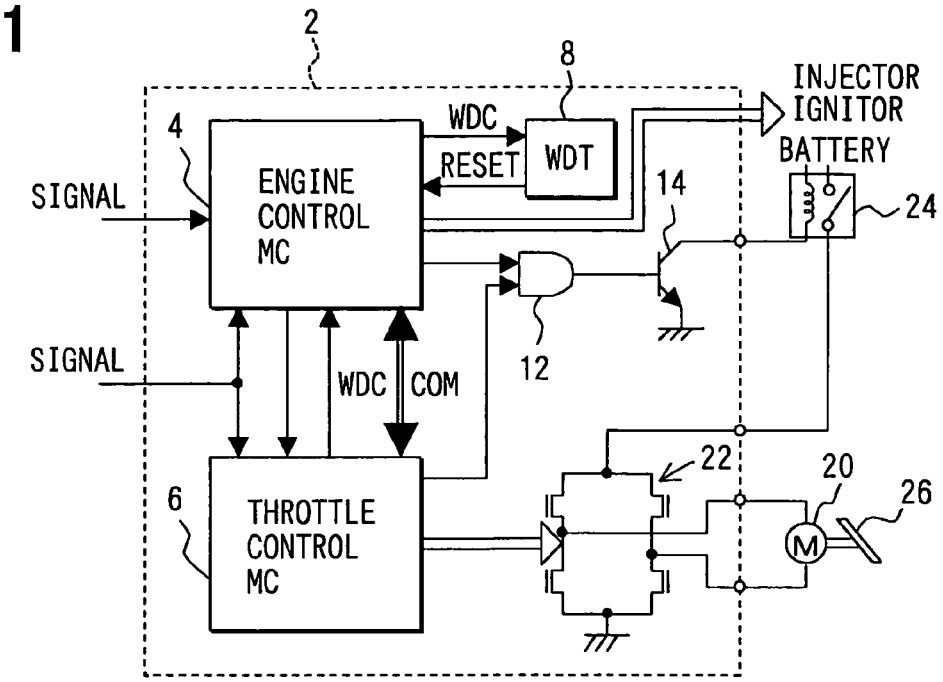
FIG. 1 is a block diagram showing an electronic control device according to embodiments of the present invention.

Referring to FIG. 1, an electronic control unit (ECU) 2 includes an engine control microcomputer (engine MC) 4 and a throttle control microcomputer (throttle MC) 6. The engine MC 4 receives signals regarding conditions of an engine such as an engine speed and a coolant temperature, an accelerator angle, and a throttle angle of a throttle valve 26. The engine MC 4 performs calculations necessary for engine control, and outputs control signals to an injector and an igniter for adjusting fuel injection quantity and ignition timing. Furthermore, the engine MC 4 calculates the target throttle angle of the throttle valve 26 based on the received signals and sends the calculated target throttle angle to the throttle MC 6.

The engine MC 4 outputs watchdog pulses WDC to a watchdog timer (WDT) 8 for monitoring its operation with the WDT 8. When the WDT 8 has detected a fault, it outputs a reset signal to the engine MC 4 for resetting the engine MC 4.

Moreover, the engine MC 4 has another watchdog timer (not shown) for monitoring operation of the throttle MC 6. The throttle MC 6 periodically outputs watchdog pulses WDC to the engine MC 4 during its normal operation according to a predetermined program. When a period during which the engine MC 4 has not received the watchdog pulses WDC exceeds a predetermined period, the engine MC 4 outputs a reset signal to the throttle MC 6 for resetting the throttle MC 6.

The engine MC 4 contains a diagnostic program (first diagnostic means) and a data transmitting program (data transmitting means) both independent from a base program that is executed for various engine controls. The diagnostic program is executed for diagnosing its operation. The data transmission program is executed for sending data regarding the diagnosis and the target throttle angle to the throttle MC 6. The diagnosis and the data transmission programs are periodically executed by an interrupt.

The throttle MC 6 contains a monitoring program (second diagnostic program) and a failsafe program in addition to a base program. The base program is executed for controlling the throttle valve 26 based on the control data, an accelerator angle, and a throttle angle all sent from the engine MC 4. The monitoring program is executed for monitoring the engine MC 4 for proper execution of the fault diagnostic program. The failsafe program is executed for a performance of a failsafe procedure when a fault is detected during the monitoring of the engine MC 4. The failsafe program performs a failsafe procedure appropriate to the kind of fault. The monitoring program and the failsafe program are also periodically performed by an interrupt.

If a critical fault is detected during the execution of the fault diagnostic program, a LOW signal is outputted form the engine MC 4 to an AND circuit 12. If a critical fault is detected during the execution of the monitoring program, a LOW signal indicating the fault is outputted from the throttle MC 6 to the AND circuit 12.

The AND circuit 12 turns on or off a relay circuit 24 that controls power supply from a battery (not shown) to a motor driving circuit 22. The motor driving circuit 22 drives a throttle motor 20 of the throttle valve 26. The AND circuit 12 outputs a HIGH signal when its inputs from the engine MC 4 and the throttle MC 6 are both HIGH signals indicating normal operation. The AND circuit 12 outputs a LOW signal when one of the inputs is a LOW signal indicating faulty operation.

The output of the AND circuit 12 is inputted to a base of a transistor 14 connected in series with a relay coil of the relay circuit 24. When a LOW signal is inputted from one of the MCs 4, 6 to the AND circuit 12, the transistor 14 turns off and the power supply to the relay coil stops. In this case, the throttle valve 26 is fixed at a complete close position with a spring (not shown), and intake air control by the throttle valve is disabled.

The throttle MC 6 performs calculations necessary for the throttle control based on the control data, the accelerator angle, and the throttle angle all sent from the engine MC 4. Then, it outputs the results of the calculations to a motor driving circuit (H-bridge circuit) 22. The motor driving circuit 22 is connected with the throttle motor 20, and controls the throttle valve 26 via the throttle motor 20 for adjusting the amount of intake air.

The engine MC 4 executes the base program for control data production including calculations of the fuel injection quantity and the ignition timing. The engine MC 4 executes the diagnostic program, including a ROM check routine (first diagnosis) and an instruction check routine (second diagnosis), the data transmitting program for sending diagnostic data to the throttle MC 6, independently from the base program.

Figure 2:
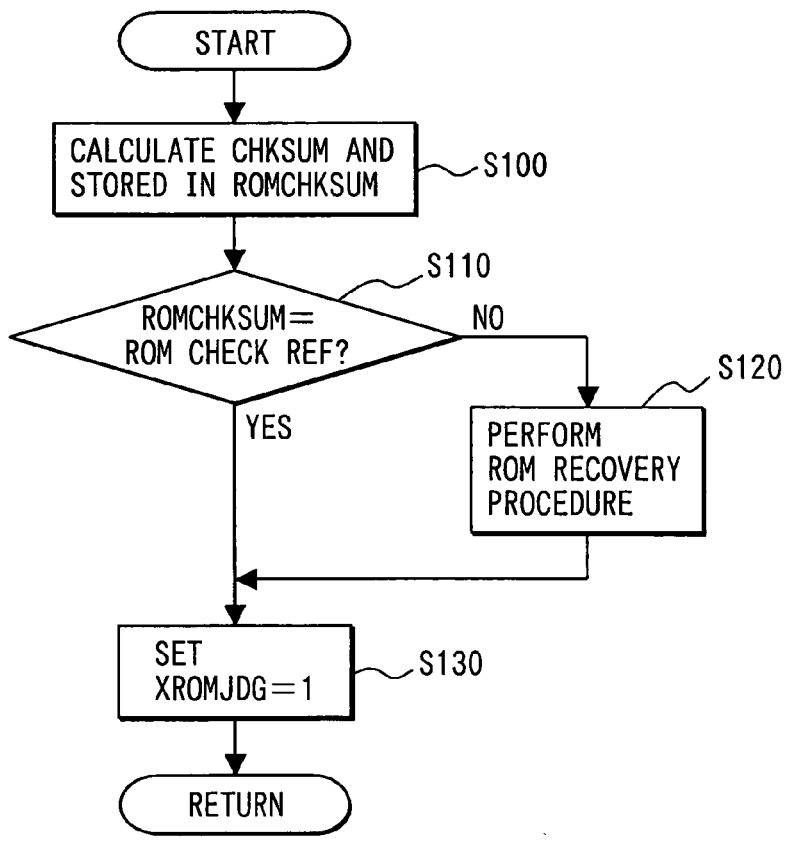
FIG. 2 is a flowchart showing a ROM check routine performed by an engine control microcomputer according to the embodiment of the present invention.

The ROM check routine shown in FIG. 2 is executed regularly, for instance every 8 ms, by an interrupt. A checksum is calculated for a predetermined range of a storage area in a ROM, and the checksum is stored in a RAM labeled ROMCHKSUM (S100). The range for the checksum calculation is altered every time the ROM check routine is performed.

A ROM check reference value pre-stored for each calculation range is read and compared with the checksum stored in the RAM ROMCHKSUM (S110). If the checksum does not match the ROM check reference value, it is determined that the ROM is faulty and a ROM fault recovery procedure is performed (S120). In the ROM fault recovery procedure, a LOW signal indicating the fault is outputted from the engine MC 4 to the AND circuit 12 for turning off the relay circuit 24. If the checksum matches the ROM check reference value (S110) or the ROM fault recovery procedure is completed (S120), a flag XROMJDG is set to 1 for indicating an execution of the ROM check routine (S130).

Figure 3:
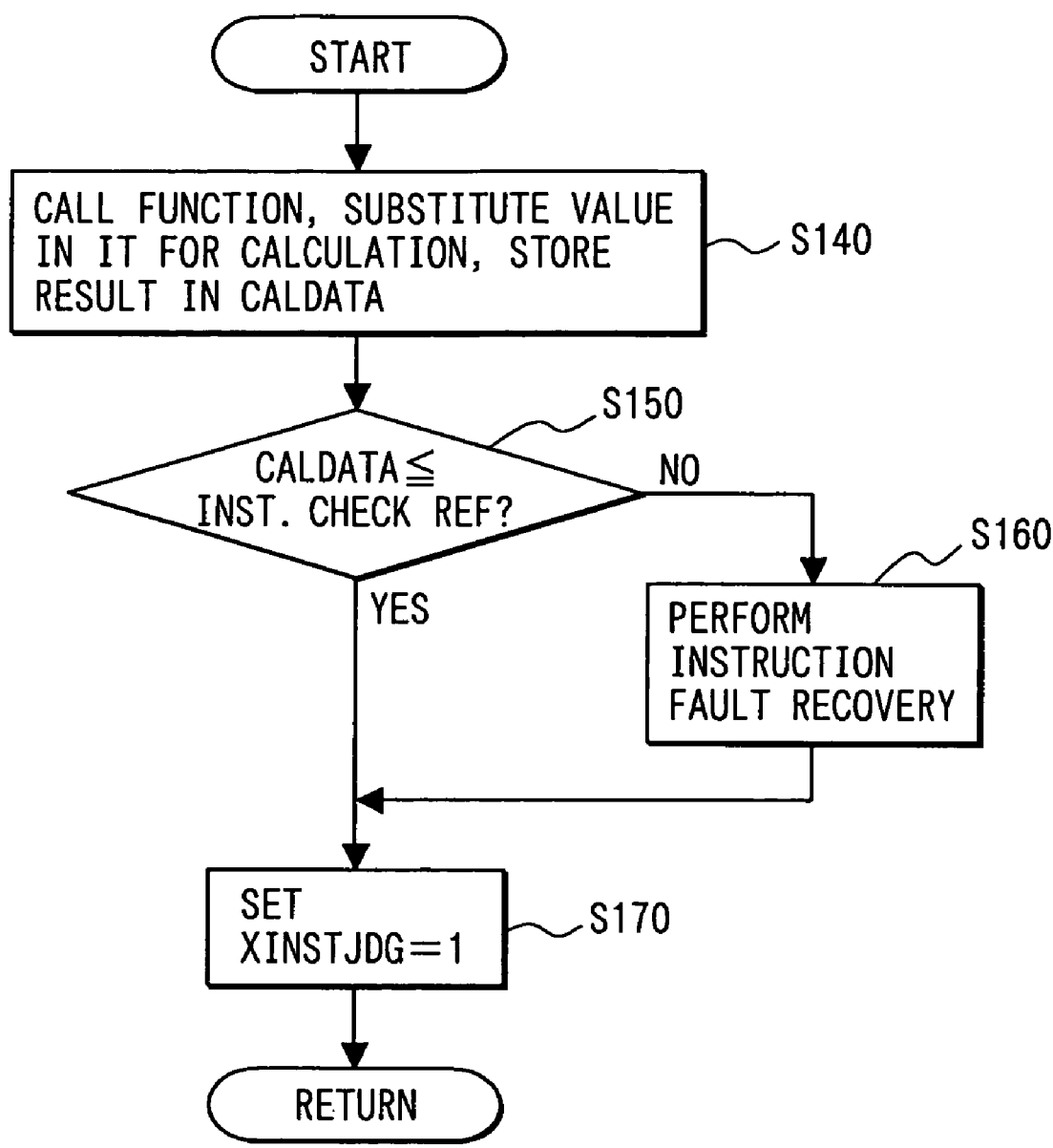
FIG. 3 is a flowchart showing an instruction check routine performed by the engine control microcomputer according to the embodiment.

The instruction check routine shown in FIG. 3 is executed regularly, for instance every 16 ms, by an interrupt. A function is called, a predetermined value (fixed value) is substituted in the function for calculation, and the result of the calculation is stored in a RAM labeled CALDATA (S140).

An instruction check reference value pre-stored for each function and each substitution value is read and compared with the calculation result stored in the RAM CALDATA (S150). If the calculation result is equal to or smaller than the instruction check reference value, it is determined that the result of the instruction check is normal. If the calculation result is larger than the instruction check reference value, it is determined that the result of the instruction check is faulty, namely, the instruction is faulty. In this case, an instruction fault recovery procedure is performed (S160). In the instruction fault recovery procedure, a LOW signal indicating the fault is outputted from the engine MC 4 to the AND circuit 12 for turning off the relay circuit 24.

The above function is used for executing the engine control and the throttle angle control. If the calculation result is equal to a predetermined value or in a predetermined range, the calculation of the function is assumed to be properly performed. The predetermined value or the predetermined range is stored as an instruction check reference value, and used for determining whether the calculation using the function is properly performed. A flag XINSTJDG is set to 1 for indicating the execution of instruction check routine (S170).

The engine MC 4 performs multiple diagnostic routines for regularly determining whether the engine control or the throttle control is executable. If a fault is detected and the control is determined inexecutable, the engine MC 4 stops power supply to the motor driving circuit 22.

Figure 4:
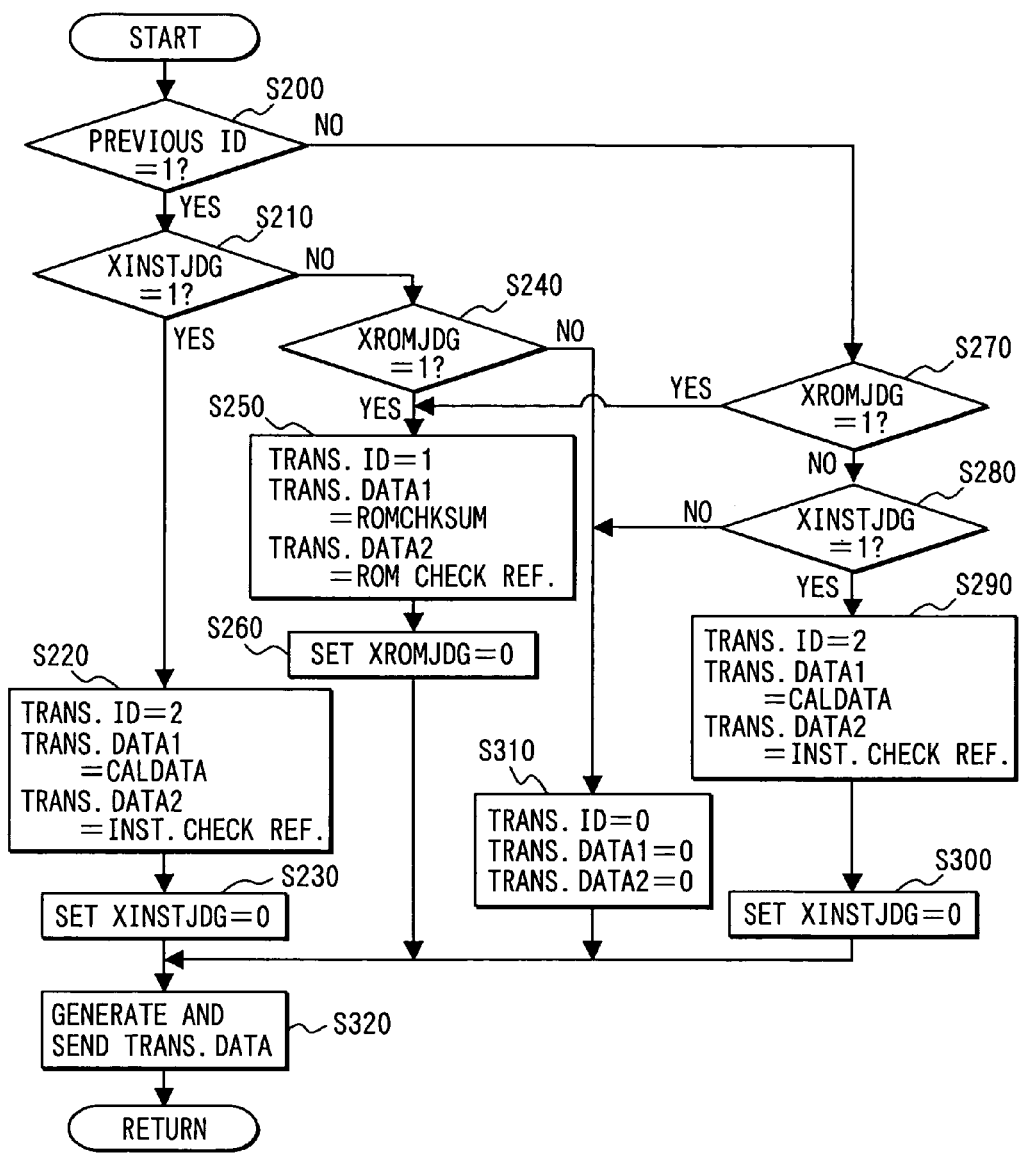
FIG. 4 is a flowchart showing a data transmission routine performed by the engine control microcomputer according to the embodiment.

The data transmission routine shown in FIG. 4 is executed independently from the diagnosis programs every 8 ms by an interrupt. Data transmitted through this data transmission routine has a structure shown in FIG. 5. The data contains n pieces of data (DATA1, DATA2, . . . , DATAn) including the checksum of the transmission number, control data indicating the target throttle angle, a set of diagnostic data, and transmission data.

The first set of diagnostic data contains transmission ID, transmission data 1, and transmission data 2 regarding the first diagnosis. The second set of diagnostic data contains transmission ID, transmission data 1, and transmission data 2 regarding the second diagnosis. The transmission ID indicates a kind of the diagnoses (ROM check, instruction check), the transmission data 1 includes the calculation result of any one of check routines, and transmission data 2 includes the reference value with which the calculation result is compared.

A kind of the diagnostic data previously transmitted is determined (S200). More specifically, it is determined whether the transmission ID of the diagnostic data is 1 indicating that the diagnostic data produced by the ROM check routine has been sent. This step is performed for preventing the same kind of diagnostic data from being always sent due to execution timing of the diagnostic program and the data transmitting program. For instance, the first set of diagnostic data and the second set of diagnostic data are alternately sent. The diagnostic data different from the previously sent diagnostic data has priority for transmission. If the different kind of data has not been ready for transmission, it is determined whether the same kind of diagnostic data has been ready for transmission. If so, the same kind of diagnostic data is transmitted.

If the transmission ID is 1, it is determined whether the instruction check has been executed based on the value of the flag SINDTJDG (S210). If the value is 1, the instruction check has been executed and the diagnostic data regarding the instruction check has been generated. Thus, the transmission ID, the transmission data 1, and the transmission data 2 are set to 2, the CALDATA, the instruction check reference value, respectively (S220). The flag XINSTJDG is set to 0 for preventing transmission of the same diagnostic data (S230).

If the flag XINSTJDG is not 1, the diagnostic data has not been generated. It is determined whether the ROM check has been executed based on the value of the flag XROMJDG (S240). If the value is 1, the ROM check has been executed and the diagnostic data regarding the ROM check has been generated. Therefore, the transmission ID, the transmission data 1, and the transmission data 2 are set to 1, the ROMCHKSUM, and the ROM check reference value, respectively (S250). The flag XROMJDG is set to 0 for preventing transmission of the same diagnostic data (S260).

If the value of the flag XROMJDG is not 1, the ROM check and the instruction check have not been executed since the previous data transmission. In this case, the transmission ID, the transmission data 1, and the transmission data 2 are all set to 0 (S310) because no data for transmission is prepared.

If the transmission ID of the previously transmitted diagnostic data is not 1 (S200), it is determined whether the value of the flag XROMJDG is 1 (S270). If so, it is determined that the diagnostic data regarding the ROM check has been generated and step S250 is performed.

If the value of the flag XROMJDG is not 1, it is determined whether the value of the flag XINSTJDG is 1 (S280). If so, it is determined that the diagnostic data regarding the instruction check has been generated and step S290 is performed. Steps S290 and S300 are performed in the same manner as steps S220 and S230. If the value of the flag XINSTJDG is not 1, the diagnostic data regarding the ROM check and the instruction check has not been generated and step S310 is performed.

Figure 5:
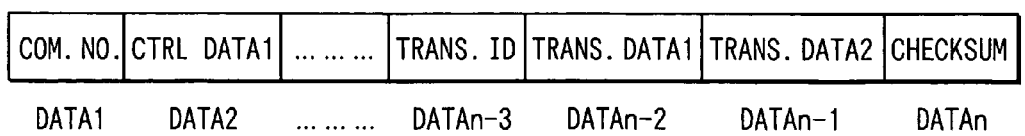
FIG. 5 is an explanatory diagram showing a structure of data transmitted through the data transmission routine according to the embodiment.

The transmission data shown in FIG. 5 is prepared by setting the diagnostic data and the control data generated by the base program (S320). In this case, the diagnostic data is any one of the first set of diagnostic data and the second set of diagnostic data whichever most recently generated or the data indicating that no data for transmission is prepared. A checksum of the transmission number, the control data, and the diagnostic data is calculated after they are determined, and added to the transmission data. When the transmission data generation is completed, the transmission data is sent from the engine MC 4 to the throttle MC 6. The transmission data is temporarily stored in the RAM for determining a kind of the transmission ID of the previously transmitted diagnostic data at step S200.

The throttle MC 6 contains a base program, a monitoring program (second diagnostic means), and a failsafe program (fault recovery means). The base program is for controlling the throttle angle of the throttle valve 26. The monitoring program is for monitoring the engine MC 4 and determining whether the diagnostic program normally operates based on the received data. The failsafe program is for executing failsafe procedures when the diagnoses of the engine MC 4 are determined faulty.

Figure 6:
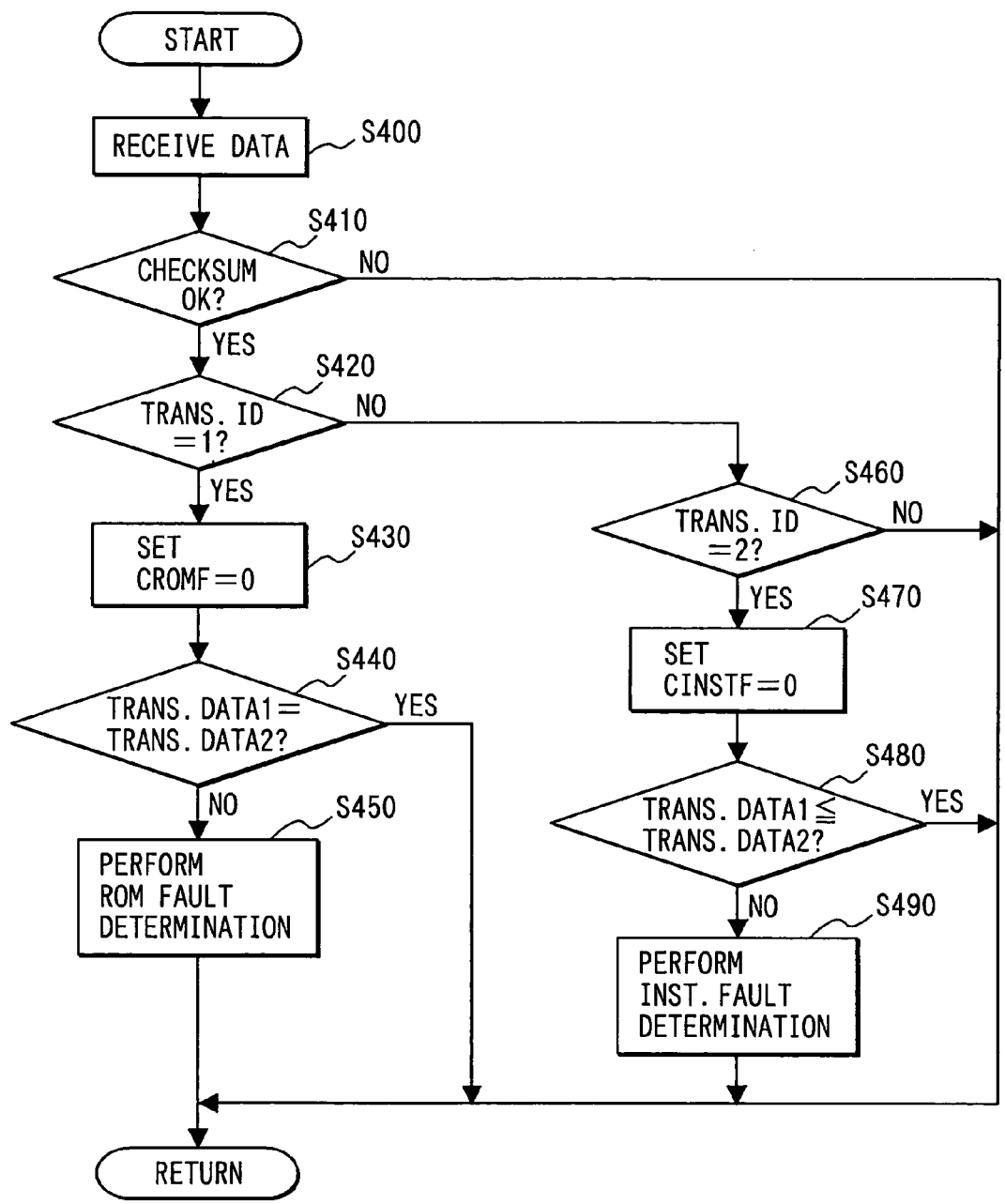
FIG. 6 is a flowchart showing a first monitoring routine performed by a throttle control microcomputer.

The first and the second monitoring routines of the throttle MC 6 will be explained referring to FIGS. 6 and 7. The first monitoring routine shown in FIG. 6 is executed when the throttle MC 6 has received transmitted data. The first monitoring routine includes steps for monitoring the ROM check routine (third diagnosis) and steps for monitoring the instruction check routine (fourth diagnosis).

The first set or the second set of diagnostic data is received from the engine MC (S400). The received data is also passed to the base program (not shown). In the base program, a control signal for the motor driving circuit 22 is generated based on control data, an accelerator angle, and a throttle angle included in the received data.

A checksum of the received data is calculated and compared with a checksum included in the received data (S410). If two checksums do not match, it is determined that the received data is faulty and therefore the first monitoring routine is terminated.

It is determined whether a transmission ID of the diagnostic data included in the received data is 1 (S420). If so, a ROM determination idle time counter CROMF is cleared by setting 0 in the counter CROMF (S430). The transmission data 1 is compared with the transmission data 2 and it is determined whether they match (S440). If they do not match, a ROM fault determination is performed (S450). If they match, the result of the ROM check is normal and therefore the first monitoring routine is terminated.

If the transmission ID is not 1, it is determined whether the transmission ID is 2 (S460). If so, an instruction determination idle time counter CINSTF is cleared (S470). The transmission data 1 is compared with the transmission data 2, and it is determined whether the transmission data 1 is larger than the transmission data 2 (S480). If transmission data 1 is larger than the transmission data 2, fault determination of the instruction check is performed (S490).

If the transmission ID is not 2, the transmission ID is assumed to be 0. In this case, the received data does not contain the diagnostic data, and therefore the first monitoring routine is terminated. If the transmission data 1 is equal to or smaller than the transmission data 2, the result of the instruction check is normal and therefore the first monitoring routine is terminated.

The throttle MC 6 receives data regarding each diagnosis performed by the engine MC 4. Thus, the throttle MC 6 can directly verify that each diagnosis operation is properly performed by the engine MC 4. Furthermore, the throttle MC 6 receives calculated values (transmission data 1 and 2) used for comparison performed by the engine MC 4 as diagnostic data, and performs the comparison between the calculated value and the reference value. Therefore, it is verified that the comparison is properly performed by the engine MC 4.

Figure 7:
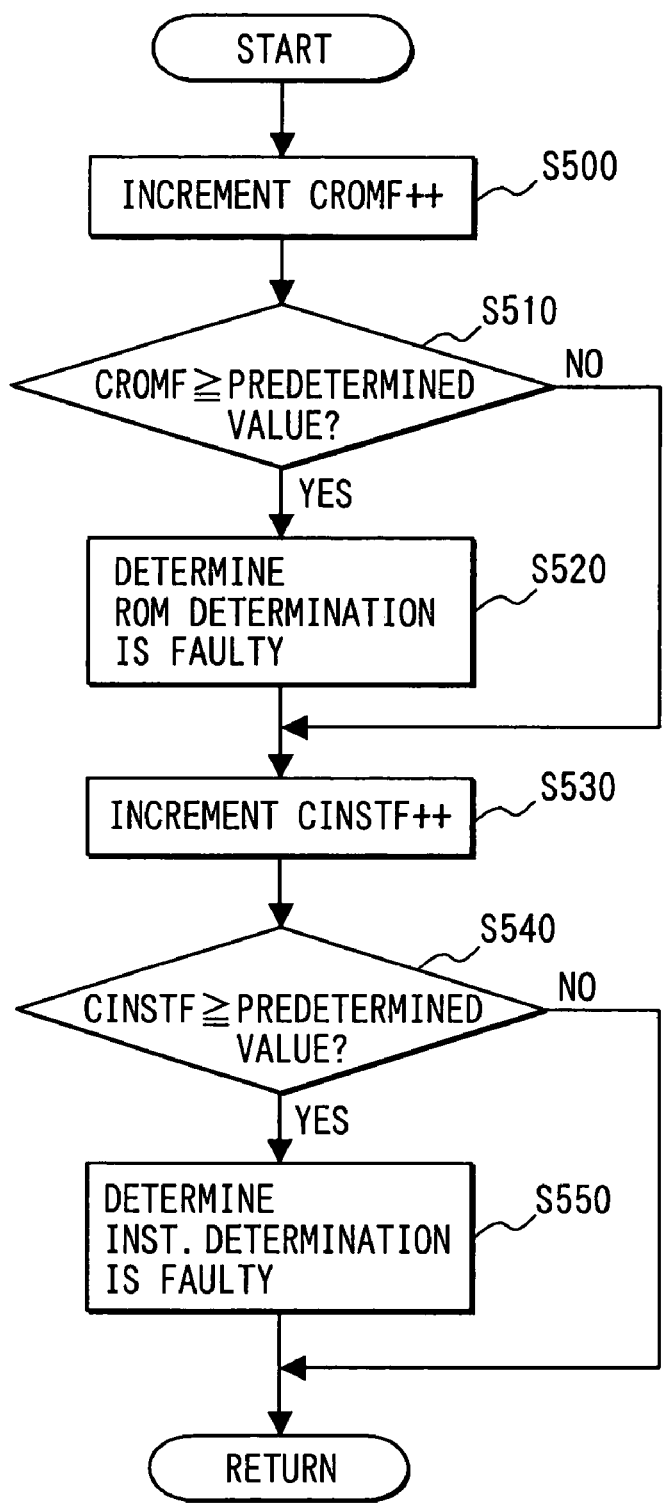
FIG. 7 is a flowchart showing a second monitoring routine performed by the throttle control microcomputer.

The second monitoring routine shown in FIG. 7 is executed every 16 ms by an interrupt. The ROM determination idle counter CROMF is incremented (S500). It is determined whether the counter CROMF is incremented to a predetermined value (S510). The counter CROMF is reset every time when the diagnostic data regarding the ROM check is received in the first monitoring routine. Thus, the throttle MC 6 is under the condition that it is unable to receive the data for more than a predetermined period if the counter CROM has reached the predetermined value. If the CROMF is incremented to the predetermined value, it is determined that the ROM determination is faulty (S520).

The instruction determination idle time counter CINSTF is incremented (S530). It is determined whether the counter CINSTF is incremented to a predetermined value (S540). The counter CINSTF is reset every time when the diagnostic data regarding the instruction check is received in the first monitoring routine. Thus, the throttle MC 6 is under the condition that it is unable to receive the data for more than a predetermined period if the counter CINSTF has reached the predetermined value. If the CINSTF is incremented to the predetermined value, it is determined that the instruction determination is faulty (S550).

Figure 8:
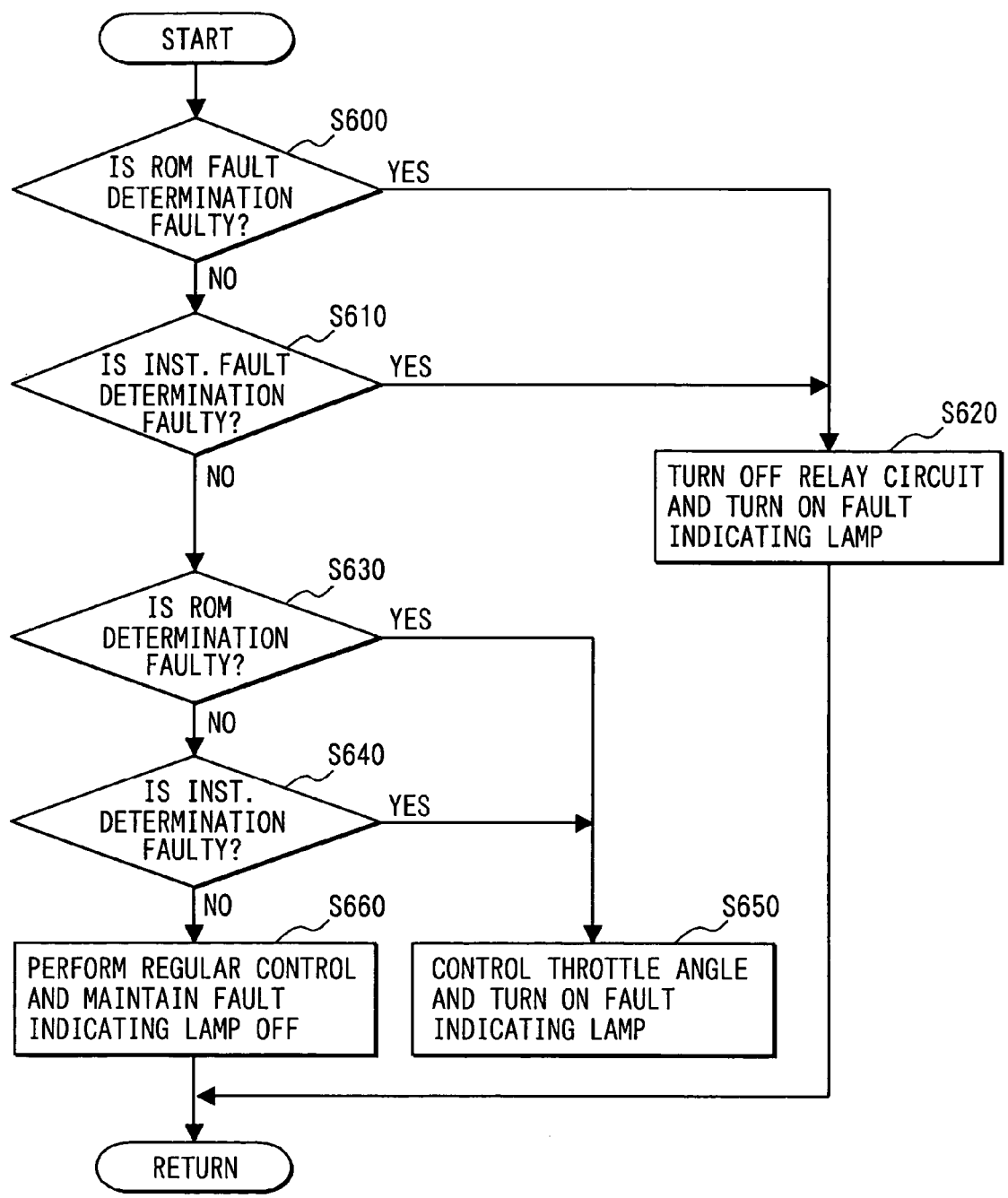
FIG. 8 is a flowchart showing a failsafe routine performed by the throttle control microcomputer.

The failsafe routine shown in FIG. 8 is executed every 16 ms by an interrupt. This routine provides different failsafe procedures (fault recovery procedures) for different faulty conditions. It is determined whether the ROM fault determination is determined faulty in the first monitoring routine (S600). Then, it is determined whether the instruction fault determination is determined faulty in the first monitoring routine (S610). If it is determined that any one of the ROM fault determination and the instruction fault determination is determined faulty in the first monitoring routine, an appropriate failsafe procedure is performed (S620). In this case, the driving of the throttle valve 26 is stopped because proper engine control and throttle control cannot be performed when functions used for the ROM and the engine controls are faulty. More specifically, a LOW signal indicating the fault is outputted from the throttle MC 6 to the AND circuit 12 for turning off the relay circuit 24. Then, a fault indicating lamp arranged on an instrument panel is turned on.

If it is determined that both ROM fault determination and instruction fault determination are determined normal, it is determined whether it is determined that the ROM determination is faulty in the second monitoring routine (S630). It is determined whether it is determined that the instruction determination is faulty in the second monitoring routine (S640). If it is determined that any one of the determinations is faulty, an appropriate failsafe procedure is performed (S650). In this failsafe procedure, the throttle angle of the throttle valve 26 is controlled and the faulty lamp is turned on.

If the ROM determination or the instruction determination is determined faulty, the engine MC 4 may not have properly completed the ROM check routine or the instruction check routine. Therefore, the throttle valve 26 is controlled with a predetermined throttle angle used as an upper limit instead of with a full throttle angle. If the calculated target throttle angle is larger than the upper limit throttle angle, the upper limit throttle angle is used as the target throttle angle.

The engine MC 4 may properly operate although the throttle MC 6 cannot verify the proper operation of the engine MC 4 because the fault diagnosis is halted. Even in such a condition, the throttle valve 26 can be controlled in a range that the vehicle is at least operable.

If it is determined that the ROM fault determination and the instruction fault determination are normal in steps S630 and S630, it is considered that a normal diagnosis is performed by the engine MC 4. Therefore, regular throttle control is performed and the faulty lamp is maintained off (S660).

In the ECU 2, the engine MC 4 sends diagnostic data (transmission IC, calculated value, and reference value) instead of watchdog pulses. Thus, the throttle MC 6 directly monitor the completion of the diagnosis performed by the engine MC 4 based on the diagnostic data.

In a RAM check process performed by the engine MC 4, parameters necessary for engine control and inverted values of the parameters are calculated. The parameters and their inverted values are stored in the RAM at the same time. Inverted values of the inverted values are calculated and compared with the parameters to verify that cells of the RAM are not corrupted. Target throttle and accelerator angles are calculated as parameters and added values are compared in the comparison. As a result, only one comparison is required. However, more than two parameters may be calculated and the comparison is performed in the same manner.

Figure 9A:
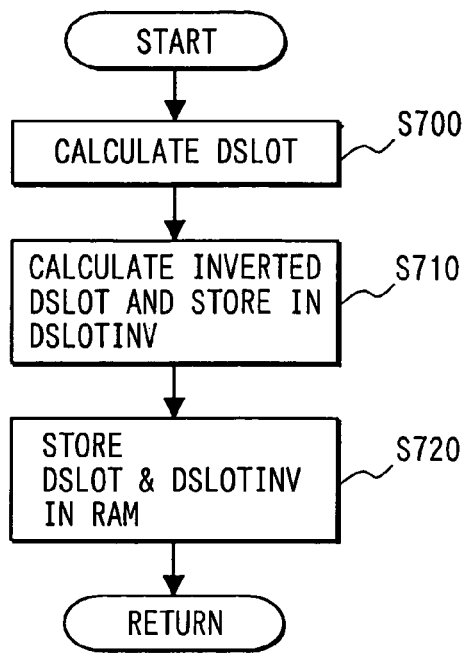
FIG. 9A is a flowchart showing a target throttle angle calculation routine according to the embodiment.

In a target throttle angle calculation routine shown in FIG. 9A, a target throttle angle DSLOT is determined by a predetermined calculation using a map or an operational expression (S700). An inverted value DSLOTINV of the target throttle angle DSLOT is calculated (S710). The target throttle angle DSLOT and its inverted value DSLOTINV are written in the RAM at the same time (S720).

Figure 9B:
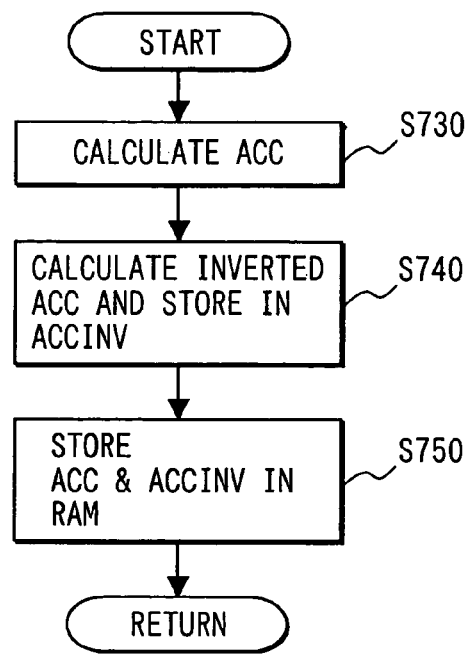
FIG. 9B is a flowchart showing an accelerator angle calculation routine according to the embodiment.

In an accelerator angle calculation routine shown in FIG. 9B, an accelerator angle ACC is determined based on the accelerator angle signal (S730). An inverted value (ACCINV) of the accelerator angle ACC is calculated (S740). The accelerator angle ACC and its inverted value (ACCINV) are stored in the RAM at the same time (S750).

Figure 9C:
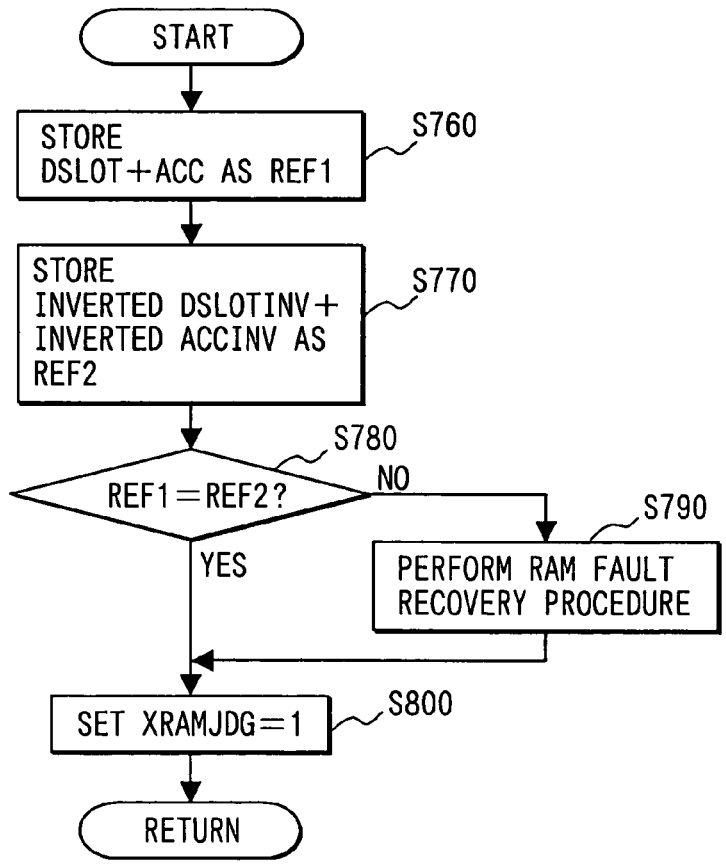
FIG. 9C is a flowchart showing a RAM check routine according to the embodiment.

The target throttle angle calculation routine and the accelerator angle calculation routine are executed every 8 ms. A RAM check routine shown in FIG. 9C is executed every 16 ms at a different timing from the execution of the above routines for determining whether the written values are valid.

In the RAM check routine, the accelerator angle ACC is added to the target throttle angle DSLOT, and the result is stored as a reference value 1 (S760). The inverted value ACCINV is added to the inverted target value DSLOTINV, and stored as a reference 2 (S770). It is determined whether the reference value 1 matches the reference value 2 (S780). If they do not match, the RAM may experience a fault and therefore the relay circuit 24 is turned off as a RAM fault recovery procedure (S790). The flag XRAMJDG is set to 1 for indicating the completion of the RAM determination (S800).

In the data transmission step, it is determined whether the flag XRAMJDG is set to 1. If the flag XRAMJDG is set to 1, it is determined that diagnostic data regarding the RAM check has been prepared. Thus, the diagnostic data including a transmission ID of the RAM check, the reference value 1, and the reference value 2 is sent to the throttle MC 6. It is preferable that the engine MC 4 sends data in order of an old transmission history.

Figure 10A:
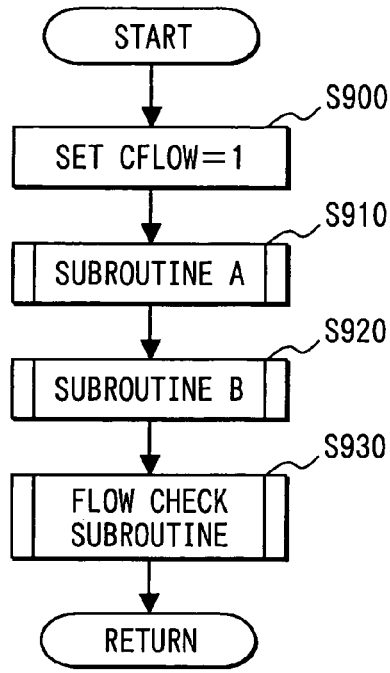
FIG. 10A is a flowchart showing a target throttle angle calculation routine according to the embodiment.

In a target throttle angle calculation routine shown in FIG. 10A, a flow check counter CFLOW is set to 0 (S900) in a target throttle angle calculation routine executed every 8 ms. After subroutines are executed (S910, S920), a flow check subroutine is executed (S930). In this target throttle angle calculation routine, a sequence of execution of the subroutines is critical. If the subroutines are not executed in the sequence, the result of the target throttle value calculation will be faulty. Therefore, the sequence of execution of the subroutines is monitored.

Figure 10B:
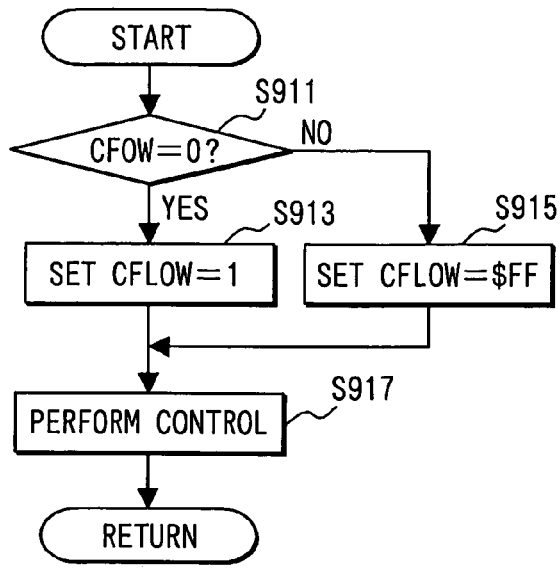
FIG. 10B is a flowchart showing a subroutine A invoked in the target throttle angle calculating routine according to the embodiment.

If the counter CFLOW is normally called in step S900, the counter CFLOW is set to 0. Therefore, in a subroutine A shown in FIG. 10B, it is determined whether the counter CFLOW is set to 0 (S911). If the counter CFLOW is set to 0, it is determined that the subroutines are executed in the correct sequence. In this case, the counter CFLOW is set to 1 (S913) for indicating the subroutines are executed in the correct sequence. If the counter CFLOW is not set to 0, it is set to $FF (S915) for indicating the subroutines are not executed in the correct sequence. A predetermined control is performed (S917), and this routine is completed.

Figure 10C:
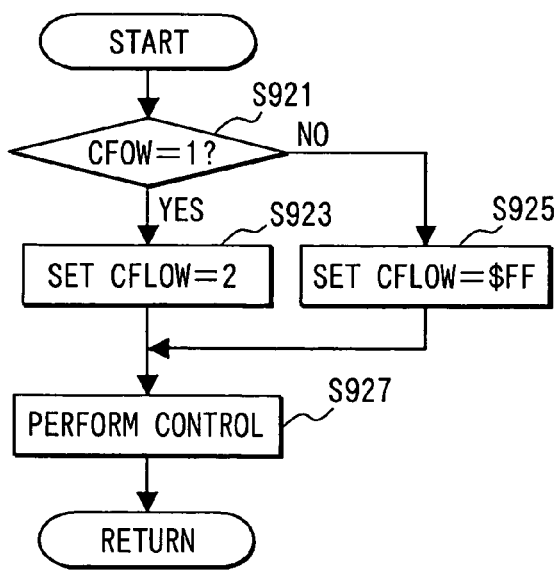
FIG. 10C is a flowchart showing a subroutine B invoked in the target throttle angle calculating routine according to the embodiment.

In a subroutine B shown in FIG. 10C, it is determined whether the counter CFLOW is set to 1, (S921). If the counter CFLOW is set to 1, it is set to 2 (S923) for indicating the subroutine B is executed. If the counter CFLOW is not set to 1, it is set to $FF (S925) for indicating the subroutines are not executed in the correct sequence. A predetermined control is performed (S927), and this routine is completed.

Figure 10D:
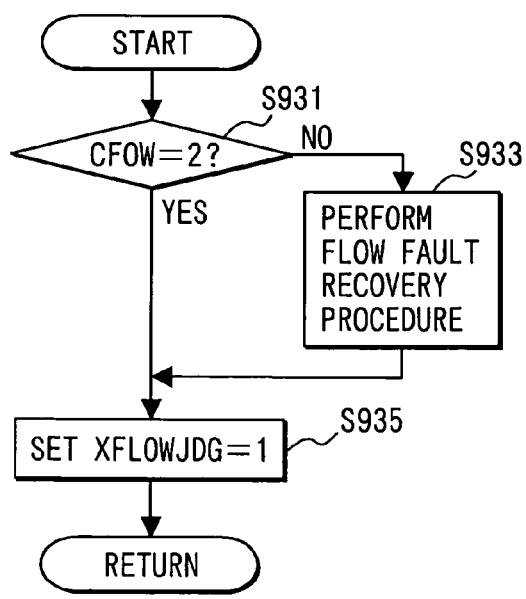
FIG. 10D is a flowchart showing a flow check subroutine invoked in the target throttle angle calculation routine according to the embodiment.

If the subroutines are executed in the correct sequence, the counter CFLOW is set to 2. In a flow check routine shown in FIG. 10D, it is determined whether the counter CFLOW is set to 2 (S931). If the counter CFLOW is set to 2, the flag XFLOWJDG is set to 1 (S935) for indicating the flow check is executed. In this case, a flow fault recovery procedure is not executed (S933).

If the counter CFLOW is not set to 2, the relay circuit 24 is turned off as an execution of an error handling procedure.

In the transmission procedure of the engine MC 4, it is determined whether the flag XFLOWJDG is set to 1. If the flag XFLOWJDG is set to 1, it is determined that the diagnostic data regarding the flow check has been prepared. Therefore, the diagnostic data including the transmission ID of the flow check, the value set in the counter CFLOW, and the reference value (2) is sent to the throttle MC 6.

The present invention should not be limited to the embodiment previously discussed and shown in the figures, but may be implemented in various ways without departing from the spirit of the invention. For example, diagnoses are not limited to the ROM check routine and the instruction check routine. Other check routines may be executed instead of or in addition to the ROM check and the instruction check routines. The engine MC 4 may perform at least one kind of diagnosis, and sends data regarding the diagnosis to the throttle MC 6.

The invention claimed is:

1. An electronic control unit comprising a first computer and a second computer, characterized in that:
   the first computer includes a first diagnostic means for diagnosing operation of the first computer by performing a first diagnosis and a second diagnosis, in which a first value and a second value are calculated using at least two kinds of operations, a first comparison is performed between the first value and a pre-stored first reference value for determining whether a relationship between the first value and the first reference value is normal, and a second comparison is performed between the second value and a pre-stored second reference value for determining whether a relationship between the second value and the second reference value is normal;
   the first computer further includes a data transmitting means for sending a first set of diagnostic data regarding the first diagnosis and a second set of diagnostic data regarding the second diagnosis, respectively;
   the second computer includes a data receiving means for receiving the first set and the second set of diagnostic data; and
   the second computer further includes a second diagnostic means for determining whether the first diagnostic means normally operates based on the first and the second diagnostic data;
   the data transmitting means sends the first set of diagnostic data including the first calculated value and the first reference value as the first diagnostic data, and the second set of diagnostic data including the second calculated value and the second reference value as the second diagnostic data;
   the second diagnostic means performs a third diagnosis for determining whether a result of the first comparison is normal, and a fourth diagnosis for determining whether a result of the second comparison is normal;
   the first diagnostic means regularly performs the first comparison and the second comparison;
   the data transmitting means sends any one of the first set of diagnostic data and the second set of diagnostic data whichever most recently generated; and
   the second diagnostic means determines that the first diagnosis is halted when a period during which the receiving means has not received the first set of diagnostic data exceeds a predetermined reference period, and that the second diagnosis is halted when a period during which the receiving means has not received the second set of diagnostic data exceeds the predetermined reference period.

2. The electronic control unit according to claim 1, wherein the data transmitting means alternately sends the first set of diagnostic data and the second set of diagnostic data.

3. The electronic control unit according to claim 1, wherein the second computer further including a fault recovery means that performs different fault recovery procedures for different conditions, including conditions in which the second diagnostic means has determined that the diagnosis is halted and in which the second diagnostic means has determined that the comparison performed by the first diagnostic means is faulty.

4. An electronic control unit comprising a first computer and a second computer, characterized in that:
   the first computer includes a first diagnostic means for diagnosing operation of the first computer by performing a diagnosis, in which a comparison is performed between a value calculated using a predetermined operation and a pre-stored reference value for determining whether a relationship between the calculated value and the pre-stored reference value is normal;
   the first computer further includes a data transmitting means for sending the calculated value and the pre-stored reference value used for the diagnosis performed by the first diagnostic means;
   the second computer includes a receiving means for receiving the calculated value and the pre-stored reference value;
   the second computer further includes a second diagnostic means for determining whether the first diagnostic means normally operates based on a comparison between the calculated value and the pre-stored reference value received by the receiving means;
   the first diagnostic means regularly performs the diagnosis;
   the data transmitting means sends the calculated value and the pre-stored reference value used in the diagnosis most recently performed; and
   the second diagnostic means determines that the diagnosis of the first diagnostic means is at halt when a period during which the receiving means has not received the calculated value and the pre-stored reference value exceeds a predetermined reference period.

5. The electronic control unit according to claim 4, wherein the second computer further including a fault recovery means that performs different fault recovery procedures for different conditions; including conditions in which the second diagnostic means has determined that the diagnosis is halted and in which the second diagnostic means has determined that the comparison performed by the first diagnostic means is faulty.

6. The electronic control unit according to claim 5, wherein:
   the first computer and the second computer are used for controlling the throttle angle of a throttle valve of a vehicular engine; and
   the fault recovery means maintains the throttle angle control with a predetermined upper limit when the second diagnostic means has determined that the diagnosis is halted by the first diagnostic means, and stops the throttle angle control when the second diagnostic means has determined that the diagnosis performed by the first diagnostic means is faulty.

7. An electronic control unit comprising a first computer and a second computer, characterized in that:
  the first computer includes a first diagnostic means for diagnosing operation of the first computer by performing a first diagnosis and a second diagnosis, in which a first value and a second value are calculated using at least two kinds of operations, a first comparison is performed between the first value and a pre-stored first reference value for determining whether a relationship between the first value and the first reference value is normal, and a second comparison is performed between the second value and a pre-stored second reference value for determining whether a relationship between the second value and the second reference value is normal;
  the first computer further includes a data transmitting means for sending a first set of diagnostic data regarding the first diagnosis and a second set of diagnostic data regarding the second diagnosis, respectively;
  the second computer includes a data receiving means for receiving the first set and the second set of diagnostic data;
  the second computer further includes a second diagnostic means for determining whether the first diagnostic means normally operates based on the first and the second diagnostic data; and
  the first computer and the second computer are both provided in a vehicle.

8. An electronic control unit comprising a first apparatus and a second apparatus, wherein:
  the first apparatus includes:
    a first diagnostic portion that performs a diagnosis operation for determining whether the first apparatus is normal based on at least one value calculated in the first apparatus; and
    a transmitting portion that transmits information with respect to the diagnosis operation of the first diagnostic portion;
  the second apparatus includes a second diagnostic portion that determines whether the first diagnostic portion is normal based on the information transmitted from the transmitting portion of the first apparatus;
  the first apparatus is a computer;
  the at least one value, which is calculated in the first apparatus, includes first and second values that are calculated by the first diagnostic portion;
  the first diagnostic portion performs a first diagnosis in the diagnosis operation to determine whether a relationship between the first value and a pre-stored first reference value is normal;
  the first diagnostic portion further performs a second diagnosis in the diagnosis operation to determined whether a relationship between the second value and a pre-stored second reference value is normal;
  the information, which is transmitted by the transmitting portion of the first apparatus, includes information with respect to at least one of the first diagnosis and the second diagnosis; and
  the second diagnostic portion determines that the first diagnostic portion is abnormal when it is determined that at least one of the first diagnosis and the second diagnosis is not performed beyond a predetermined time period based on the information transmitted from the transmitting portion of the first apparatus.

9. The electronic control unit according to claim 7, wherein the transmitting portion of the first apparatus periodically transmits the information throughout a normal operation of the first apparatus.

10. The electronic control unit according to claim 7, wherein the first apparatus and the second apparatus are used for controlling an engine.

11. An electronic control unit comprising a first computer and a second computer, characterized in that:
  the first computer includes a first diagnostic means for diagnosing operation of the first computer by performing a first diagnosis and a second diagnosis, in which a first value and a second value are calculated using at least two kinds of operations, a first comparison is performed between the first value and a pre-stored first reference value for determining whether a relationship between the first value and the first reference value is normal, and a second comparison is performed between the second value and a pre-stored second reference value for determining whether a relationship between the second value and the second reference value is normal;
  the first computer further includes a data transmitting means for sending a first set of diagnostic data regarding the first diagnosis and a second set of diagnostic data regarding the second diagnosis, respectively;
  the second computer includes a data receiving means for receiving the first set and the second set of diagnostic data;
  the second computer further includes a second diagnostic means for determining whether the first diagnostic means normally operates based on the first and the second diagnostic data; and
  the first computer and the second computer are located locally with respect to each other.

12. An electronic control unit comprising a first computer and a second computer, characterized in that:
  the first computer includes a first diagnostic means for diagnosing operation of the first computer by performing a diagnosis, in which a comparison is performed between a value calculated using a predetermined operation and a pre-stored reference value for determining whether a relationship between the calculated value and the pre-stored reference value is normal;
  the first computer further includes a data transmitting means for sending the calculated value and the pre-stored reference value used for the diagnosis performed by the first diagnostic means;
  the second computer includes a receiving means for receiving the calculated value and the pre-stored reference value;
  the second computer further includes a second diagnostic means for determining whether the first diagnostic means normally operates based on a comparison between the calculated value and the pre-stored reference value received by the receiving means; and
  the first computer and the second computer are located locally with respect to each other.

13. An electronic control unit comprising a first apparatus and a second apparatus, wherein:
  the first apparatus includes:
    a first diagnostic portion that performs a diagnosis operation for determining whether the first apparatus is normal based on at least one value calculated in the first apparatus; and
    a transmitting portion that transmits information with respect to the diagnosis operation of the first diagnostic portion;

the second apparatus includes a second diagnostic portion that determines whether the first diagnostic portion is normal based on the information transmitted from the transmitting portion of the first apparatus; and the first apparatus and the second apparatus are located locally with respect to each other.

14. An electronic control unit comprising a first computer and a second computer, characterized in that:

the first computer includes a first diagnostic means for diagnosing operation of the first computer by performing a diagnosis, in which a comparison is performed between a value calculated using a predetermined operation and a pre-stored reference value for determining whether a relationship between the calculated value and the pre-stored reference value is normal;

the first computer further includes a data transmitting means for sending the calculated value and the pre-stored reference value used for the diagnosis performed by the first diagnostic means;

the second computer includes a receiving means for receiving the calculated value and the pre-stored reference value;

the second computer further includes a second diagnostic means for determining whether the first diagnostic means normally operates based on a comparison between the calculated value and the pre-stored reference value received by the receiving means; and the first computer and the second computer are both provided in a vehicle.

15. An electronic control unit comprising a first apparatus and a second apparatus, wherein:

the first apparatus includes:
a first diagnostic portion that performs a diagnosis operation for determining whether the first apparatus is normal based on at least one value calculated in the first apparatus; and
a transmitting portion that transmits information with respect to the diagnosis operation of the first diagnostic portion;

the second apparatus includes a second diagnostic portion that determines whether the first diagnostic portion is normal based on the information transmitted from the transmitting portion of the first apparatus; and the first apparatus and the second apparatus are both provided in a vehicle.

16. A method of operating a first computer and a second computer, the method comprising:

in the first computer, performing a diagnosing operation of the first computer by performing a diagnosis, in which a comparison is performed between a value calculated using a predetermined operation and a pre-stored reference value for determining whether a relationship between the calculated value and the pre-stored reference value is normal;

transmitting, from the first computer, the calculated value and the pre-stored reference value used for the diagnosis performed by the first computer;

receiving, in the second computer, the calculated value and the pre-stored reference value; and determining, in the second computer, whether the diagnosing operation of the first computer is performed normally based on a comparison between the calculated value and the pre-stored reference value received by the second computer;

wherein the first computer regularly performs the diagnosis;

the first computer transmits the calculated value and the pre-stored reference value used in the diagnosis most recently performed; and the second computer determines that the diagnosis of the first computer is at halt when a period during which the second computer has not received the calculated value and the pre-stored reference value exceeds a predetermined reference period.

* * * * *